(12) United States Patent
Nie et al.

(10) Patent No.: US 9,769,407 B2
(45) Date of Patent: Sep. 19, 2017

(54) CURRENT ACCUMULATIVE PIXEL STRUCTURE FOR CMOS-TDI IMAGE SENSOR

(71) Applicant: Tianjin University, Tianjin (CN)

(72) Inventors: Kaiming Nie, Tianjin (CN); Suying Yao, Tianjin (CN); Jiangtao Xu, Tianjin (CN); Zaifeng Shi, Tianjin (CN); Zhiyuan Gao, Tianjin (CN); Jing Gao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 14/916,565

(22) PCT Filed: Dec. 12, 2014

(86) PCT No.: PCT/CN2014/093756
§ 371 (c)(1),
(2) Date: Mar. 3, 2016

(87) PCT Pub. No.: WO2016/041274
PCT Pub. Date: Mar. 24, 2016

(65) Prior Publication Data
US 2017/0180666 A1 Jun. 22, 2017

(30) Foreign Application Priority Data
Sep. 15, 2014 (CN) .......................... 2014 1 0470252

(51) Int. Cl.
*H04N 5/374* (2011.01)
*H04N 5/378* (2011.01)
(Continued)

(52) U.S. Cl.
CPC ......... *H04N 5/3743* (2013.01); *H04N 3/1525* (2013.01); *H04N 5/378* (2013.01); *H04N 5/361* (2013.01)

(58) Field of Classification Search
CPC ... H04N 2201/0084; H04N 2201/0081; H04N 3/1587; H04N 5/3743; H04N 5/378;
(Continued)

(56) References Cited

U.S. PATENT DOCUMENTS 6,459,077 B1 * 10/2002 Hynecek ........... H01L 27/14856
250/208.1
7,557,334 B2 * 7/2009 Lee ........................ H04N 3/155
250/208.1
(Continued)

*Primary Examiner* — Hung Lam
(74) *Attorney, Agent, or Firm* — Bei & Ocean; George G. Wang

(57) ABSTRACT

The present invention relates to technical field of analog integrated circuit design. TDI function is better realized by CMOS image sensor and it improves scanning frequency of the CMOS-TDI image sensor and extends application range of TDI technique. To this end, the present invention proposes a technical solution of a current accumulative pixel structure for CMOS-TDI image sensor which comprises a photodiode, four MOS transistors M1, M2, M3, M4, four switches S1, S2, S3, S4, and two capacitors C1, C2; the connection relationship thereof is denoted below: the anode of the photodiode D1 is connected to a ground wire, while the cathode thereof is connected to an input end; the drain and gate of the transistor M1 are both connected with the input end, while the source thereof is connected with a power source VDD. The current invention mainly finds its application in analog integration circuit design.

3 Claims, 2 Drawing Sheets

(51) Int. Cl.
*H04N 3/14* (2006.01)
*H04N 5/361* (2011.01)

(58) Field of Classification Search
CPC ............. H04N 27/14856; H04N 5/361; H04N 3/1568; H04N 3/1525; H01L 27/14856
See application file for complete search history.

(56) References Cited

U.S. PATENT DOCUMENTS

| | | | |
|---|---|---|---|
| 8,039,811 B1* | 10/2011 | Li | H04N 5/32 250/370.14 |
| 2008/0079830 A1* | 4/2008 | Lepage | H04N 3/1525 348/295 |
| 2009/0009645 A1* | 1/2009 | Schrey | H04N 5/3743 348/308 |
| 2011/0279725 A1* | 11/2011 | Cazaux | H04N 5/3743 348/308 |
| 2011/0298956 A1* | 12/2011 | Giffard | H01L 27/14603 348/308 |

* cited by examiner

CURRENT ACCUMULATIVE PIXEL STRUCTURE FOR CMOS-TDI IMAGE SENSOR

CROSS-REFERENCE TO RELATED APPLICATIONS

This application claims priority from CN Application No. CN201410470252.0, filed Sep. 15, 2014 and PCT Application No. PCT/CN2014/093756, filed Dec. 12, 2014, the contents of which are incorporated herein in the entirety by reference.

FIELD OF THE INVENTION

The present invention relates to technical field of analog integrated circuit design and more particularly, relates to a current accumulative pixel structure for CMOS-TDI image sensor.

BACKGROUND OF THE INVENTION

TDI image sensor may realize higher SNR and sensitivity due to its special scanning manner and is especially suitable for high speed movement and low illumination environment. The basic principles of TDI lie in linear scanning with area pixel matrix, thus realizing exposure of the same moving object by pixels of different lines, and accumulating of exposure result of each time. This equivalently extends exposure integration time of the object, thereby greatly improving SNR and sensitivity. The conventional TDI image sensors are formed by CCD devices. Compared to CCD image sensor, CMOS image sensor has lower power consumption, lower cost, and higher integration. As such, in case the TDI function (CMOS-TDI image sensor) is realized by CMOS image sensor, cost of the TDI camera will be decreased dramatically and it will be widely used. In prior art, to realize TDI function using CMOS image sensor, analog signal accumulators are incorporated into the CMOS image sensor to work as a CMOS-TDI image sensor. That is, analog signals output by the pixels are in advance input into the analog signal accumulator to finish accumulation of the identically exposed signals, and then accumulated analog signals are sent to the ADC to be output quantitatively. Furthermore, prior art has also proposed to quantitatively output signals of the CMOS image sensor through the ADC at first and then, finish accumulation of identically exposed signals by a digital domain accumulator built in chip. These two kinds of techniques, either performing accumulation and then quantitative output or performing quantification and then accumulative output, both require reading out of exposure result of all pixels of the CMOS image sensor during a single exposure period (that is line transfer period). As a result, readout speed certainly will limit the shortest exposure period, i.e., the largest scanning frequency. To solve this problem, prior art has proposed integration of buffer cell into the pixels to realize signal delivery between adjacent pixels. Similar to CCD-type TDI image sensor capable of realizing accumulation of signals in a pipelined manner, only the output of the last line of pixels during each exposure time needs to be read out quantitatively. Accordingly, limitation of the scanning frequency caused by readout speed is eliminated, thereby realizing faster scanning frequency. This technique however, during pipelined accumulation of pixel output signal, will introduce a great deal of thermal noise and offset voltage of the operational amplifier. In addition, fill factor of pixels is decreased due to integration of buffer cells into the pixels, hence limiting sensitivity of the sensor.

SUMMARY OF THE INVENTION

The present invention is intended to overcome drawbacks of prior arts and to better realize TDI function of CMOS image sensor, improve scanning frequency of the CMOS-TDI image sensor, and extend application range of the TDI technique. To these ends, a current accumulative pixel structure for CMOS-TDI image sensor is proposed. A current accumulative pixel structure for CMOS-TDI image sensor comprises a photodiode, four MOS transistors M1, M2, M3 and M4, four switches S1, S2, S3 and S4, and two capacitors C1, C2; wherein the connection relationships thereof are denoted below: the anode of the photodiode is connected to a ground wire, while the cathode thereof is connected to an input end; the drain and gate of the transistor M1 are both connected with the input end, while the source thereof is connected with a power source VDD; the source of the transistor M2 is connected to the power source VDD, while its gate is connected to the gate of the transistor M1, the drain of the transistor M2 is connected to both drain and gate of the transistor M3; the source of the transistor M3 is connected to the ground wire; lower electrode plates of both capacitors C1 and C2 are connected to the ground wire, whereas their upper electrode plates are connected to the gate of the transistor M3 through the switches S1 and S3 and then connected to the gate of the transistor M4 through the switches S2 and S4 respectively; and the source of the transistor M4 is connected to the ground wire, while its drain is connected to an output end.

The detailed operation process for realizing pipelined TDI signal accumulation by the row of pixels is described as below: during the $M^{th}$ line transfer period, an object X passes through the $N^{th}$ pixel, and photocurrent generated in the photodiode D1 and front-end output current are summed and comes into the transistor M3 via the mirror transistors M1 and M2; assume that when the switches S1 and S4 are closed, current IM passing through the transistor M3 is transformed into voltage signal and is stored in the capacitor C1; in $M+1^{th}$ line transfer period, the object X passes through the $N+1^{th}$ pixel; as the input of the $N+1^{th}$ pixel is connected to the output of the $N^{th}$ pixel, and the switches S2 and S3 are closed at this time, the voltage signal of the $N^{th}$ pixel stored in the capacitor C1 is transformed by the transistor M4 into current IM and flows through the transistor M4; sum of the current IM passing through the transistor M1 of the $N+1^{th}$ pixel and photocurrent generated by the photodiode is referred as to IM+1; similar pixel N+1 transforms this current into voltage signal and stores the same into the capacitor C2, and this voltage signal will be again transformed into current and delivered to a next pixel during a next line transfer period; by the above-mentioned operation process, current signal IM stored in the $N^{th}$ pixel is just the sum of photocurrent generated in previous N pixels of the same object, thus realizing TDI signal accumulation function.

The layout of the present invention is described below: by connection in series of the input and output of one row of pixels, a pipelined current accumulative TDI pixel array is defined; behind the last line of pixels, a current-voltage transformation unit is cascaded to transform the current which is accumulated and outputted by the last line pixels into voltage signal and further transform it by a back-end ADC into digital signal for output.

The present invention has the following features and good effects:

The current accumulative pixel structure for CMOS-TDI image sensor is able to realize transfer the output signal of previous pixels to next pixels at exposure time, and obtained the pipelined accumulation of exposure result to the same object by the pixels of the same column. In each exposure period, output of the last line pixels is required to be read out, thus decreasing limitation of the shortest exposure time caused by readout speed, and improving the largest scanning frequency of the sensor. Operational amplifier structure is not employed to the pixel structure, in addition, only one switched capacitor sampling operation is introduced in the course of accumulation, thus reducing thermal noise. The present invention may better realize TDI function, improve scanning frequency of the CMOS-TDI image sensor, and expand application range of the TDI technique.

DETAILED DESCRIPTION OF PARTICULAR EMBODIMENTS OF THE INVENTION

Figure 1:
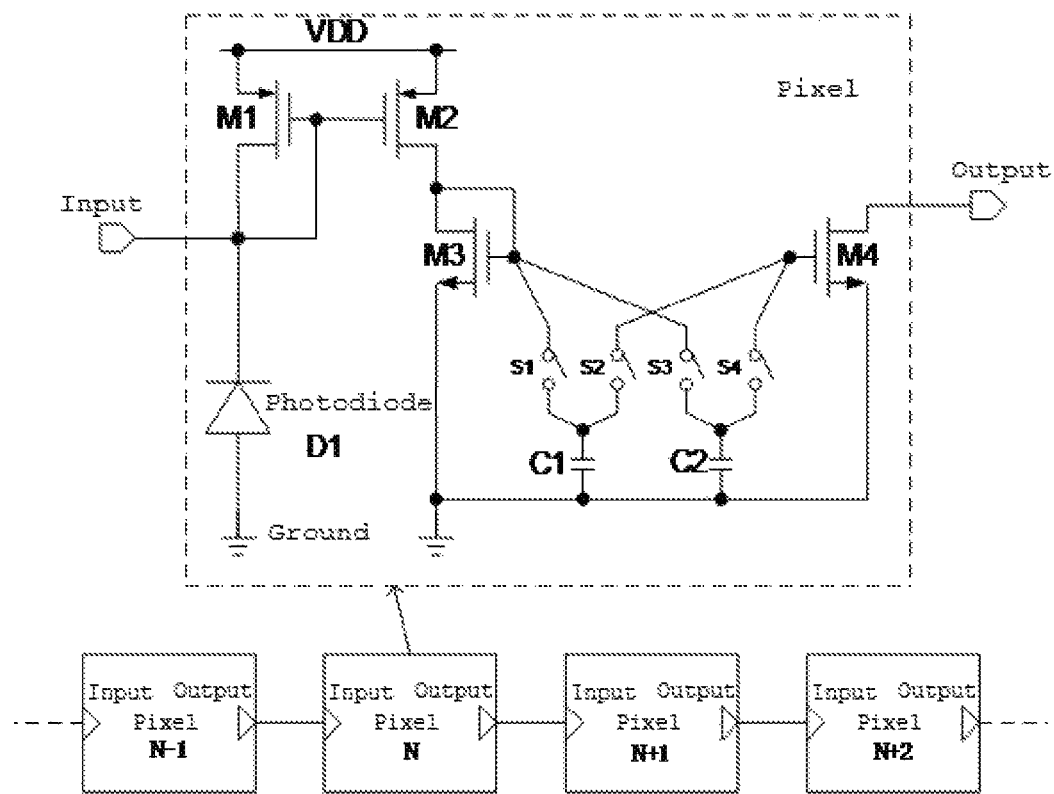
FIG. 1 schematically shows a pixel structure according to the invention.
Figure 2:
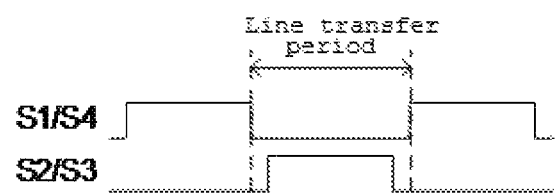
FIG. 2 indicates schematic pixel timing sequence control of the present invention.

A current accumulative pixel structure for CMOS-TDI image sensor proposed by current invention is shown in FIG. 1. As shown, the pixel structure comprises a photodiode D1, four MOS transistors M1, M2, M3 and M4, four switches S1, S2, S3 and S4), and two capacitors C1, C2, the connection relationship thereof is denoted below. The anode of the photodiode D1 is connected to a ground wire, while the cathode thereof is connected to an input end. The drain and gate of the transistor M1 are both connected with the input end, while the source thereof is connected with a power source VDD. The source of the transistor M2 is connected to the power source VDD, while its gate is connected to the gate of the transistor M1, the drain of the transistor M2 is connected to both of the drain and gate of the transistor M3. The source of the transistor M3 is connected to the ground wire. Lower electrode plates of both capacitors C1 and C2 are connected to the ground wire, whereas their upper electrode plates are connected to the gate of the transistor M3 through the switches S1 and S3 and then connected to the gate of the transistor M4 through the switches S2 and S4 respectively. The source of the transistor M4 is connected to the ground wire, while its drain is connected to an output end. As indicated in FIG. 1, a single row of pixels of the CMOS-TDI image sensor is generated by connection of the input and output of various different pixels. Under timing sequence control as shown in FIG. 2, this row of pixels is able to realize pipelined TDI signal accumulation. The detailed operation process is described as below. During the $M^{th}$ line transfer period, an object X passes through the $N^{th}$ pixel, and photocurrent generated in the photodiode D1 and front-end output current are summed and comes into the transistor M3 via the imaged transistors M1 and M2. Assume that when the switches S1 and S4 are closed, current IM passing through the transistor M3 is transformed into voltage signal and is stored in the capacitor C1. In $M+1^{th}$ line transfer period, the object X passes through the $N+1^{th}$ pixel. As the input of the $N+1^{th}$ pixel is connected to the output of the $N^{th}$ pixel, and the switches S2 and S3 are closed at this time, the voltage signal of the $N^{th}$ pixel stored in the capacitor C1 is transformed by the transistor M4 into current IM and flow through the transistor M4. Sum of the current IM passing through the transistor M1 of the $N+1^{th}$ pixel and photocurrent generated by the photodiode is referred as to IM+1. Similar pixel N+1 transforms this current into voltage signal and stores the same into the capacitor C2, and this voltage signal will be again transformed into current and delivered to a next pixel during a next line transfer period. By the above mentioned operation process, current signal IM stored in the $N^{th}$ pixel is just the sum of photocurrent generated in previous N pixels of the same object, thus realizing TDI signal accumulation function.

Figure 3:
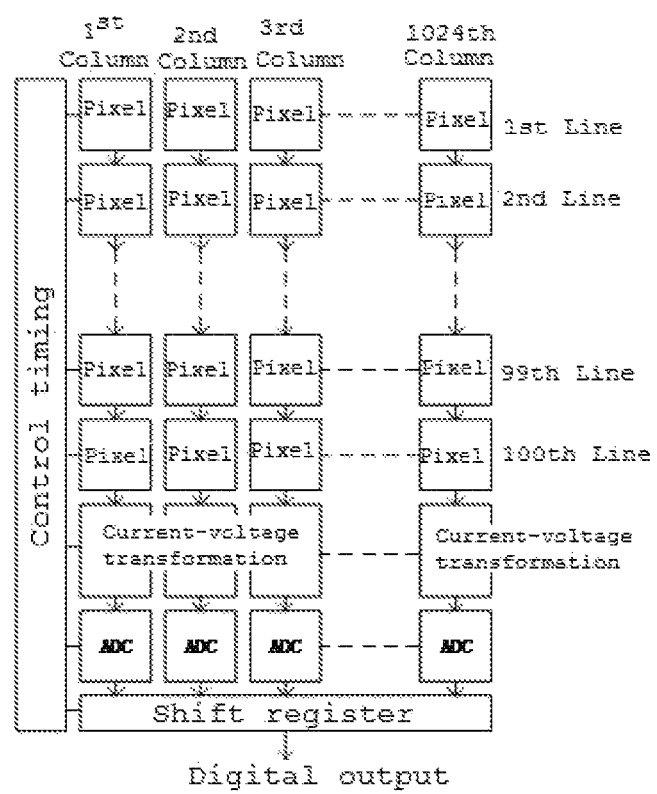
FIG. 3 schematically shows construction of a CMOS-TDI image sensor using the pixel structure of the invention.

To make clear objects, technical solution and advantages of the invention, detailed description will be provided to the embodiments of the invention in connection with examples. The construction of a 1024×100 CMOS-TDI image sensor employing the pixel structure of the present invention is shown in FIG. 3. By connection in series of the input and output of one row of pixels, a pipelined current accumulative TDI pixel array is defined. Behind the last line of pixels (that is the $100^{th}$ line pixels), a current-voltage transformation unit is connected to transform the current which is accumulated for 100 times current accumulation and outputted by the last line pixels into voltage signal and further transform it by a back-end ADC into digital signal for output. If the line transfer period is 5 ms, then scanning frequency is 200 KHz, while transformation rate of the ADC is also only 200 KHz.

What is claimed is:

1. A current accumulative pixel structure for CMOS-TDI image sensor comprising a photodiode, four MOS transistors M1, M2, M3, M4, four switches S1, S2, S3, S4, and two capacitors C1, C2; wherein the connection relationships thereof are denoted below: the anode of the photodiode D1 is connected to a ground wire, while the cathode thereof is connected to an input end; the drain and gate of the transistor M1 are both connected with the input end, while the source thereof is connected with a power source VDD; the source of the transistor M2 is connected to the power source VDD, while its gate is connected to the gate of the transistor M1, its drain is connected to both drain and gate of the transistor M3; the source of the transistor M3 is connected to the ground wire; lower electrode plates of both capacitors C1 and C2 are connected to the ground wire, whereas their upper electrode plates are connected to the gate of the transistor M3 through the switches S1 and S3 and then connected to the gate of the transistor M4 through the switches S2 and S4 respectively; and the source of the transistor M4 is connected to the ground wire, while its drain is connected to an output end.

2. The current accumulative pixel structure for CMOS-TDI image sensor according to claim 1, wherein the detailed operation process for realizing pipelined TDI signal accumulation by the row of pixels is described as below: during the $M^{th}$ line transfer period, an object X passes through the $N^{th}$ pixel, and photocurrent generated in the photodiode D1 and front-end output current are summed and comes into the transistor M3 via the imaged transistors M1 and M2; assume that when the switches S1 and S4 are closed, current IM passing through the transistor M3 is transformed into voltage signal and is stored in the capacitor C1; in $M+1^{th}$ line transfer period, the object X passes through the $N+1^{th}$ pixel; as the input of the $N+1^{th}$ pixel is connected to the output of the $N^{th}$ pixel, and the switches S2 and S3 are closed at this time, the voltage signal of the $N^{th}$ pixel stored in the capacitor C1 is transformed by the transistor M4 into current IM and flows through the transistor M4; sum of the current IM passing through the transistor M1 of the N+1$^{th}$ pixel and photocurrent generated by the photodiode is referred to IM+1; similar pixel N+1 transforms this current into voltage signal and stores the same into the capacitor C2, and this voltage signal will be again transformed into current and delivered to a next pixel during a next line transfer period; by the above mentioned operation process, current signal IM stored in the N$^{th}$ pixel is just the sum of photocurrent generated in previous N pixels of the same object, thus realizing TDI signal accumulation function.

3. The current accumulative pixel structure for CMOS-TDI image sensor according to claim 1, wherein the layout is described below: by connection in series of the input and output of one row of pixels, a pipelined current accumulative TDI pixel array is defined; behind the last line of pixels, a current-voltage transformation unit is cascaded to transform the current which is accumulated and outputted by the last line pixels into voltage signal and further transform it by a back-end ADC into digital signal for output.

* * * * *